Inventor
Agenor Eugene St.Germain

Inventor
Agenor Eugene St. Germain
by Roberts, Cushman & Grooves
att'ys.

May 15, 1956 — A. E. ST. GERMAIN — 2,745,124
APPARATUS FOR MOLDING BOOT AND SHOE PARTS
Filed Dec. 28, 1953 — 5 Sheets-Sheet 5

Inventor
Agenor Eugene St. Germain
by Roberts, Cushman & Grover
Att'ys.

United States Patent Office 2,745,124
Patented May 15, 1956

2,745,124

APPARATUS FOR MOLDING BOOT AND SHOE PARTS

Agenor Eugene St. Germain, Haverhill, Mass.

Application December 28, 1953, Serial No. 400,449

14 Claims. (Cl. 12—97)

This invention relates to shoe manufacture, and more particularly to an apparatus for premolding parts of boots and shoe and constitutes a continuation-in-part of my pending application, Serial No. 200,442, filed December 12, 1950.

The practice of lasting in shoe making is for the purpose of pulling the upper material taut on the last and to make it conform as closely as possible to the exact contour of the last surface, however, even when carried out by skillful operators, there is a tendency for the upper material to drum where there are changes in the contour, for example from an elevated area to a depressed area. There is also a tendency for the upper material to bulge when drawn about convex surfaces, especially if they are partially spherical. The foregoing difficulties are most evident at the toe of the last, particularly if the last used has a very flat instep arch so that it is difficult to draw the upper snugly about the toe, and are further aggravated by increasing the lasting stresses in an attempt to bring the upper close to the surface of the last. Corresponding difficulties are encountered in making rubber shoes, such as overshoes, boots and the like of canvas and rubber, or rubber-like materials wherein shaping is considerably more extensive than in leather shoe manufacture since it includes the entire upper part of the foot and ankle.

The principal object of this invention is to avoid the foregoing difficulties by premolding the upper at the toe portion and/or throughout a substantial portion of the instep at the top of the foot preparatory to placing the upper on the last for the subsequent bottom attaching operations. A further object is to provide an apparatus for premolding uppers of leather and rubber shoes made according to conventional shoe and boot making methods. Other objects are to provide an apparatus in which premolding may be performed accurately, without danger of damaging the upper material, which will enable one operator to mold a plurality of parts on the same piece of apparatus without waiting periods between molding operations, and hence to provide for a rapid production of molded parts, and which will be at least partially power operated so as to maintain a high productive rate without physical hardship to the operator. Still further objects are to provide an apparatus for effecting the molding of the parts by a combination of pressure and heat so as to be permanent and durable, which is of comparatively simple construction, involving a minimum of operating parts, which is easily operable and hence does not require employment of skilled operators, is provided with guide means for preventing faulty, off-center molding, and hence eliminating rejects, which has replaceable mold parts so that different shoe styles may be molded by a simple substitution of parts, and which is free from both mechanical and electrical hazards.

As herein illustrated, the apparatus has a supporting frame on which are mounted one or more molding units. Each of the units consists of cooperable, relatively movable mold parts between which may be placed the part to be molded, and has associated with it, means for effecting the necessary relative movement of the mold parts to bring them together. There is holding means for holding the mold parts together with the work clamped therebetween after the parts have been brought together, timing means operable at the end of a predetermined time to release the holding means so that they may be separated, and means for effecting a positive separation of the parts when they have been released. The holding means is preferably electrically operated and, as illustrated, is a solenoid. The solenoids of the respective units are connected by way of a main circuit to a source of power and each has a secondary circuit within the main circuit which includes a starting switch, for example a knee operated switch, a holding relay and a timing device, so arranged that when the starting switch is operated to energize the solenoid, the relay is engaged to hold the solenoid circuit closed and to start the timing device. The timing device is adjustable to any predetermined time period and at the termination of that period, will automatically open the relay, which in turn deenergizes the solenoid. The mold parts consist of mutually engageable members relatively movable to and from each other to shape the parts placed therebetween. In one form of the invention the mutually engageable members have complementary surfaces. Alternatively, one of the members is yieldable and will conform to the other member when the two are brought together under pressure thereby to mold the shoe part placed between the members to the surface contour of one of the parts. The parts initially have plenty of clearance between them so that the margin of an upper placed therebetween may extend beyond the molding surface and are arranged so that they are progressively engaged, having their initial point of contact close to the ends of the parts, which corresponds to the tip of the toe portion of the upper, so as to seize the upper at the tip of the toe and hold it fast while the mold parts move angularly about their initial point of contact into engagement with the entire upper portion. There is also means for imparting considerable pressure to the parts as they are brought into complete engagement to draw the parts into complete mutual engagement, and for heating one of the parts so as to impart a permanent set to the upper material and/or to unite parts of the upper whereas in rubber shoe manufacture the upper is comprised of several layers of rubber and fabric joined together with rubber cement.

The invention will now be described in greater detail with reference to the accompanying drawings wherein.

Referring to the drawings, the molding apparatus consists of a box-like supporting frame 10 upon which is mounted a plurality of molding units 12, preferably four units, although the frame may be made to accommodate a greater or lesser number of units. The frame holds the molding units at a convenient height from the floor so that an operator standing in front of the machine can work comfortably, and provides cabinet space in its base for containing most of the operating mechanism. The frame is substantially rectangular, having a horizontal top 14, spaced parallel sides 16 joined at their upper ends to the top member 14 and at their lower ends to a bottom member 15. The front and back sides of the frame are open, but are provided with covers 18 and 19 suitably fastened thereto, but removable to give access to the interior of the frame in the event that the operating mechanism has to be repaired.

Figure 11:
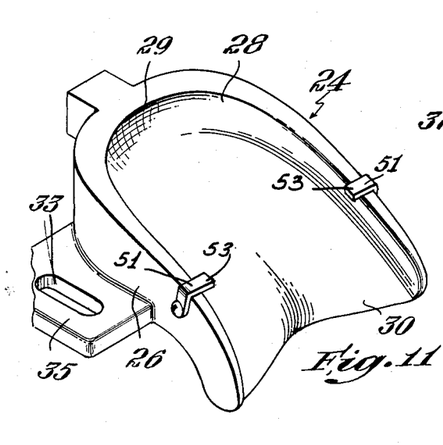
Fig. 11 is a perspective view of the female mold part.
Figure 12:
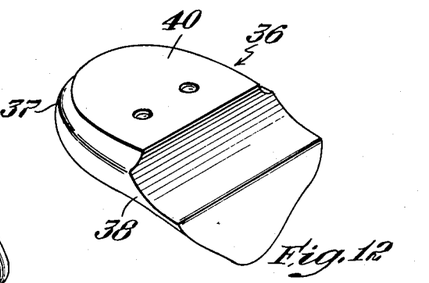
Fig. 12 is a perspective view of the male mold part.
Figures 13, 15:
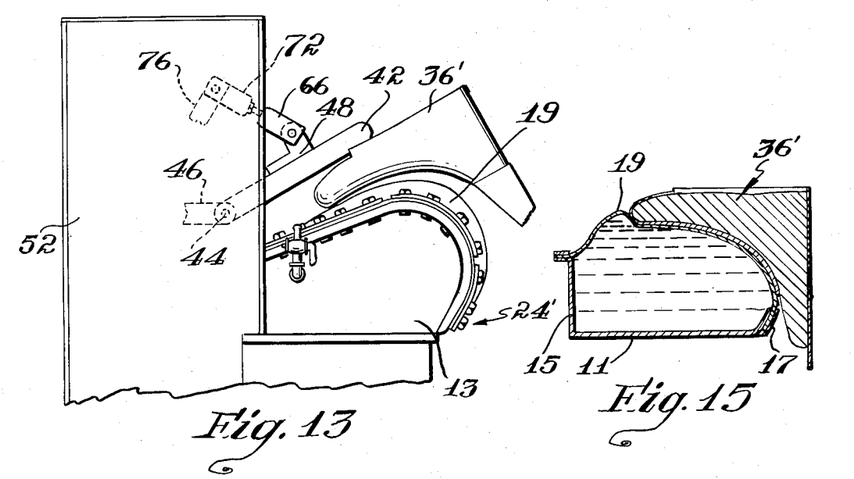
Fig. 13 is a side elevation of mold parts for rubber shoe manufacture.
Fig. 15 is a side elevation in section diagrammatically illustrating the mold parts brought together with a shoe part therebetween.

The molding units 12 are spaced along the top 14 and as illustrated in Figs. 1 to 6 inclusive, each consists of male and female mold parts adapted to be brought together to mold a shoe part placed therebetween. Each female mold part 24, one of which is shown in Fig. 11, is mounted on a plate 22 fast to the upper forwardly declining surface of a block 20, the latter being bolted to the top 14. The female mold part 24 which is cast with a block-like base 26 having a flat bottom surface for contact with the flat surface of the plate 22, has in its upper face a recess 28 which is concave both transversely and longitudinally corresponding substantially to the shape of the forepart of a last. The forward end of the cavity corresponds to the tip of the toe and the rearwardly and downwardly extending portion 30 corresponds substantially to the instep portion of the last. The female member is adjustably fastened to the plate 22 by means of bolts 32 which extend through enlarged holes 33 in ears 35 formed at opposite sides of the casting and may easily be removed and replaced by one of different size or style. The enlarged holes 33 afford both lateral and longitudinal adjustment of the mold on the plate. The plate 22 is quite thick and has a circular depression on its upper side within which is mounted a doughnut-shaped heating element (not shown) which is supplied with current through a coil 34 mounted on the plate 22 at the rear of the mold. Above the female mold member 24 is mounted a male mold member 36, a perspective view of which is shown in Fig. 12, having a surface 38 which is convex both transversely and longitudinally, complementary to the concave surface 28 of the female mold. The male mold has a flat rear surface 40 and this is bolted to an angular bracket 42 which has extending laterally therefrom at opposite sides yoke-like arms 43, the extremities of which are bent down and pivotally mounted on pins 44 which extend horizontally inward from a pair of spaced arms 46 extending forwardly above the female mold from a bar 56. As thus mounted (see Fig. 3) there is plenty of clearance between the forward ends of the mold parts so that the marginal portions of an upper having a lasting allowance which extend beyond the part that is to be actually seized between the mold parts for molding can be introduced therebetween and extend forwardly beyond the mold parts. The bar 56 is fastened to the forward edges of a pair of spaced parallel side walls 52 joined at their top ends by a web 50 and having at their bottom ends integral flanges 54 by which they are bolted to the top 14. The bar 56 is yieldably fastened to the walls 52 by a bolt 58 passing rearwardly from the bars 56 between the walls through transversely extending, forwardly and rearwardly spaced webs 60—60 fast at their ends to the walls. A nut 62 on the bolt constrains a spring 64 also on the bolt, placed between the nut and the forward web 60 so as yieldably to hold the bar 56 in place. As thus mounted, the male mold part 36 is adapted to be moved angularly about the axes of the pins 44 to and from the female member (Figs. 3–6 inclusive) and is held against forward displacement with reference to the female member by the bolt and spring 58 and 64. A guide finger 51 (Fig. 2) is fixed to each side of the female mold part. Each finger has an inwardly curved portion 53 which overlies the mold cavity and limits movement of the shoe part forwardly toward the toe by engagement with its peripheral edge. The guides prevent creeping of the shoe part upwardly more on one side than the other.

Figures 14, 17:
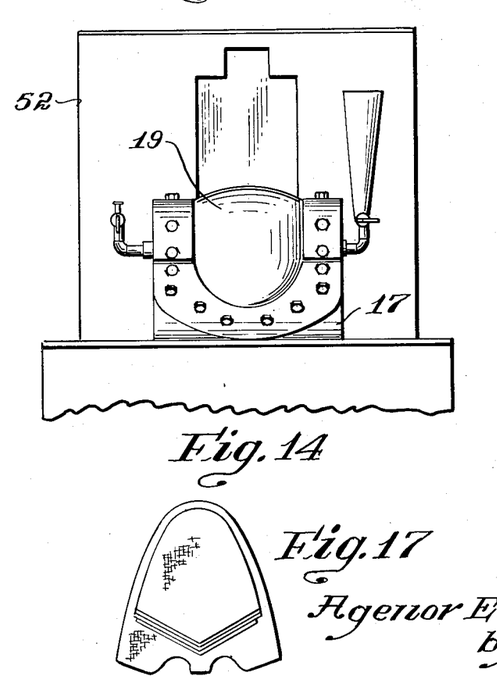
Fig. 14 is a front elevation of the lower mold part shown in Fig. 13.
Fig. 17 is a plan view of the upper of a rubber shoe.
Figure 16:
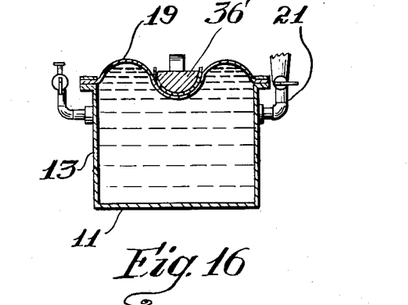
Fig. 16 is a front elevation in section diagrammatically illustrating the mold parts brought together with a shoe part therebetween.

The foregoing parts are particularly adapted to molding of the forepart of leather shoes, however, the invention is equally applicable by modification of the mold parts as will now appear to rubber shoe manufacture. Referring to Fig. 17, where there is shown a rubber shoe upper, it is at once evident that the forepart of the upper of a rubber shoe is of considerably greater area than a leather shoe and consists of several layers of sheet material attached together with rubber cement. Typically, there is an outer layer of rubber, a reinforcing layer of fabric, a second layer of rubber, a second layer of reinforcing fabric and a final lining layer. The rubber shoe upper requires more extensive molding and in certain respects greater conformity than leather uppers hence the molding members are constructed not only to operate on the toe but the vamp, quarters and portions of the upper which cover the waist and lower part of the ankle. The mold parts which may still be referred to as male and female members since the male member enters the female mold as it does above, consists of a male part 36' of very much the same shape as that heretofore described and a female part 24' of very different kind which is yieldably conformable to the surface of the male part when the latter is pressed against it. The male part 36 differs primarily in that it includes the neck of the last and an extension forming a handle. The last is metal and has a recess therein for a heating element and in accordance with the description of the male part 36, is mounted in the same manner as the latter for movement to and from the female mold. The female mold 24' comprises a hollow box having a bottom 11, side walls 13, a back wall 15, an abbreviated front wall 17, and a yieldable top wall 19, which is connected to the top edges of the back wall, extends forwardly along the top edges of the side walls and downwardly over the front edges of the side walls to the top edge of the front wall. The upper and front edges of the side walls are curved to follow the normal curvature of the profile of the top part of the male mold and the top and front wall which is composed of flexible sheet material normally follows the contour of the top and front edges of the side walls. The flexible wall hereinafter called the diaphragm is a sheet of heavy fabric reinforced rubber or rubber-like material, fastened along its edges to the back wall, side wall and front wall by superposed plates which are bolted to laterally extending flanges integral with the edges. The front wall has a U-shaped opening in it extending downwardly nearly to the bottom and the flexible wall extends downwardly into this U-shaped opening in a progressively narrowing manner. The box is filled with water through a fill pipe 21 having a valve therein. For convenience, in filling the box, a funnel is fastened to the fill pipe above the valve. When the box is filled the valve is shut so that the water in the box cannot escape. The elevation of the pipe or funnel is sufficient so as to create enough pressure head to swell the diaphragm to a smooth convex curvature subtending the top of the box. As thus constructed, when the male part is brought into engagement with the female mold it will depress the flexible diaphragm causing the latter to swell about it, taking its contour accurately and causing an upper placed therebetween to conform with great fidelity to the shape of the male part. As is previously described, the male part is mounted for angular movement about the axis of the pin 44 so that the same progressive molding of the upper is secured as with the mold parts 28 and 36.

To effect angular movement the bracket has an upper, forwardly extending arm 48 to which there is pivotally connected one end of a link 66, the latter being forked to embrace the end of the arm 48. The link 66 is connected to a link 72 by a threaded bolt 70 which permits adjustment of the over-all length of the links 66 and 72 so as to increase or decrease the angular movement of the male mold part with reference to the female mold part. While the male mold part is rigidly held against transverse rocking by the pins 44—44, the pivot connections permit rocking the male member fore and aft between the bracket and links so that it may be manipulated manually after it is partially drawn into engagement with the female mold part to seat it correctly. The link 72 is pivotally connected to a bell crank 74 having arms 76 and 78 which is pivotally fulcrumed on a bolt 80° extending horizontally between the walls 52—52. The arm 78 of the bell crank is pivotally connected to the upper end of a vertical actuating rod 80 which extends downwardly therefrom through the rear cover 19 to the bottom of the frame 10 where it is pivotally connected to a forwardly extending treadle rod 84 fulcrumed at 86 on a post 87 rising from the bottom 15. The forward end of the treadle rod projects from the front cover 18 and has on it a treadle 88. Depression of the treadle elevates the rod 80, rocks the bell crank 74 in a clockwise direction and hence rocks the bracket 42 to which the male mold part is fastened, forwardly in a clockwise direction about the pins 44—44 into engagement with the female mold part.

Within the rear cover 19 there are fixed to the actuating rod 80 a pair of spaced collars 90—90. Between these collars there are mounted on the rod 80 a pair of movable collars 92 which are spring pressed toward each other by a pair of springs 94 interposed between them and the fixed collars 90. An arm 96 having a forked rear end 98 arranged to embrace the rod 80 is disposed with its forked end between the movable collars 92, which thus provides a yieldable connection between the rod and arm. The arm 96 is fulcrumed at 100 on a post 102 fast to a transversely extending rail 104, the opposite ends of which are secured to the side walls 16. The forward end of the arm 96 has hung therefrom a link 106, the lower end of which is connected to a plunger 108 which forms part of a solenoid consisting of the plunger 108, and a coil 110, the latter being bolted to the rail 104. When the rod 80 has been elevated to bring the mold parts into engagement by stepping on the treadle 88, the arm 96 is rocked in a clockwise direction about its fulcrum 100 so as to push the core 108 into the coil 110. By energizing the solenoid, as will appear hereinafter, the core may then be held in the coil so as to hold the rod 80 elevated and hence the mold parts engaged, without holding the foot on the treadle. This permits successive operation of the units, since after the mold parts of one unit have been drawn together, and the solenoid energized, the operator may then go to the next unit and perform a similar operation while the previous unit is being held under molding pressure. With experience, a skilled operator may trip the solenoid operating switch during the initial downward movement of the treadle, thus using the solenoid for drawing the parts together as well as for holding them in contact.

Also mounted in the frame in conjunction with the solenoid (Fig. 2) are an operating switch 114, a fuse 112, a relief relay 116, a holding relay 118 and a timing clock 120. The foregoing elements, as will appear in greater detail with reference to the wiring diagram of Fig. 10, serve to bring the solenoid into operation, hold it energized for a predetermined length of time and then release it.

There is also mounted on the top of the frame (Fig. 1) a thermostat control box 121 connected by conductors 122 to a source of power through which current passes by way of conductors 123 to the coil 34 and heating element in the female mold part. By adjustment of the thermostat the temperature of the mold may be varied. Within the heating circuit for each unit there is a signal lamp 124 mounted on the top 14 beside the mold unit, which lights up when the mold unit is at the proper temperature, thus indicating that the unit is ready for operation.

Figure 10:
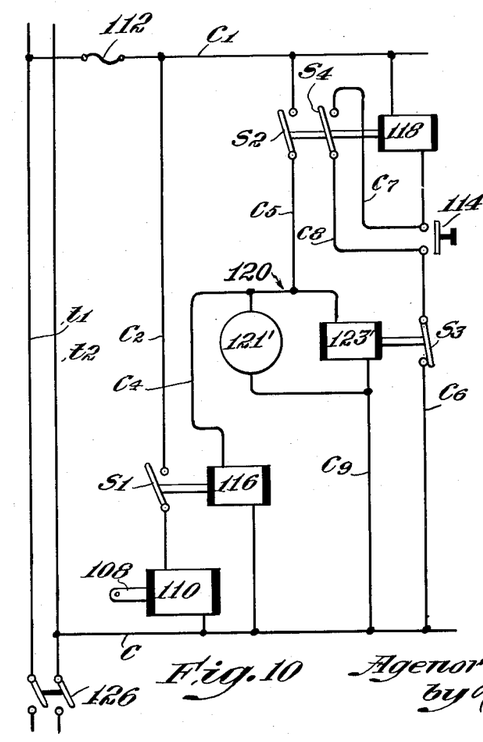
Fig. 10 is a wiring diagram.

Referring to Fig. 10, the wiring diagram illustrates the arrangement of the main operating circuit and one of the secondary solenoid circuits of which there are as many as there are units. At the top of the frame at the right-hand side, in a convenient position for operation is the main control switch 126. This switch appears on the wiring diagram at the lower left-hand side and is connected across the main lines $t1$ and $t2$. Closing the switch 126 connects the secondary circuits for each of the molding units by way of conductors $c$ and $c1$. In the conductor $c'$ there is the fuse 112 of predetermined capacity which will burn out if an excess of current enters the circuit, hence to prevent harm to the machine. The operating solenoid 110 is connected across the conductors $c$, $c1$ by way of a conductor $c2$ in which there is interposed a switch $s1$ operated by a relief relay 116 consisting of a resistance coil designed to prevent a surge of current upon operation of the solenoid, through the timing clock. The relief relay 116 is connected across the conductors $c$, $c1$ by conductors $c4$ and $c5$, the latter having in it one switch $s2$ of a double pole holding relay 118. The coil of the double pole relay is interposed in a conductor $c6$ which crosses the conductors $c$, $c1$. Also in the conductor $c6$ is the starting switch 114 and the timing switch $s3$. The starting switch 114 has two poles in the conductor $c6$ and these are connected by conductors $c7$ and $c8$ to the other pole $s4$ of the double pole relay 118. The timing device 120, which is in the form of a clock 121', is connected across the conductors $c$ and $c1$ by way of the conductors $c4$, $c5$ and a conductor $c9$ and has a coil 123' for actuating the switch $s3$. In operation, the main switch 126 is first closed to supply current to the main circuit. Thereafter, each of the secondary circuits is operated independently by tripping the starting switch 114. When the starting switch 114 is tripped, current is permitted to pass between the lines $c$ and $c1$ through the conductor $c6$ by way of the coil 118 and timing switch $s3$, thus completing a current through the double pole relay which closes the switches $s2$ and $s4$. As soon as the switches $s2$ and $s4$ are closed, the holding relay will then remain closed by way of the conductors $c7$, $c8$, $s3$ and $c6$ until the current is broken. Closing of the switch $s2$ closes the circuit through the relief coil 116, hence closing the switch $s1$ and this in turn closes the circuit through the solenoid 110, energizing it. At the same time the timing device 120 is started. At the end of the timing period, the timing device opens the switch $s3$, thus breaking the current through the conductors $c7$, $c8$ and $c6$, which releases the double pole switch, thereby opening the switch $s2$. This in turn opens the switch $s1$ and interrupts the current to the solenoid. The coil 123' is a spring returned solenoid and hence once the current is broken in the circuit the solenoid spring will return the switch $s3$ to a closed position. The timing clock 121' may be adjusted to run for a predetermined time and then to break the circuit through the holding relay so that the solenoid is deenergized.

Figure 1:
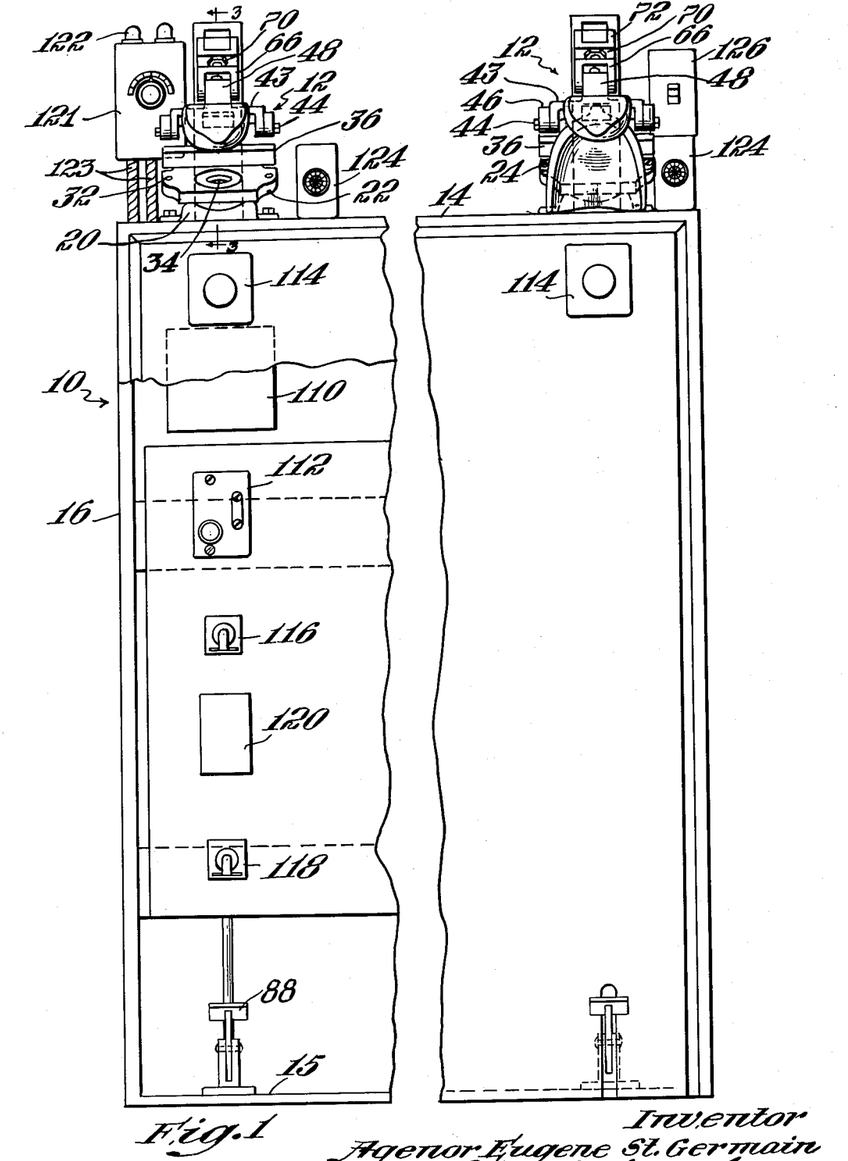
Fig. 1 is a front elevation of the machine, showing the opposite ends, the mid portion being broken away.
Figure 2:
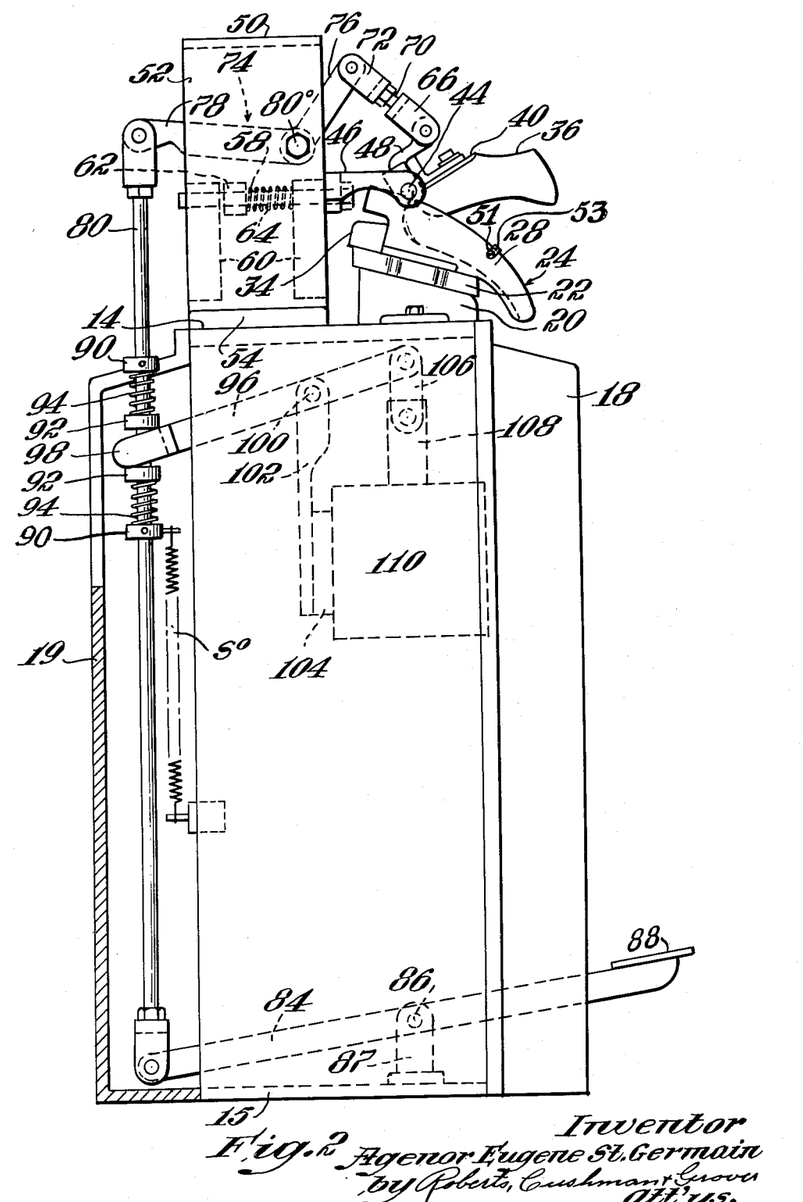
Fig. 2 is a side elevation of the machine as seen from the left side of Fig. 1.
Figure 3:
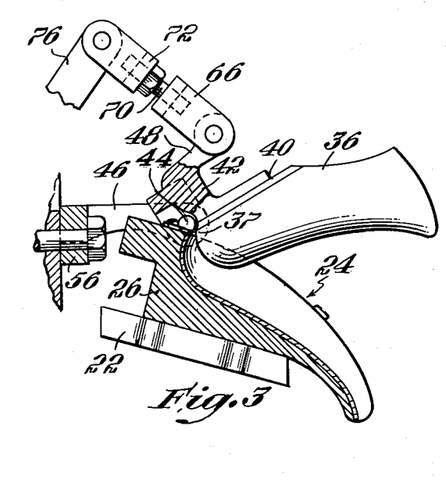
Fig. 3 is a vertical section through the mold parts on the line 3—3 of Fig. 1 to larger scale showing the initial position of the parts prior to introduction of a shoe part therebetween.
Figure 4:
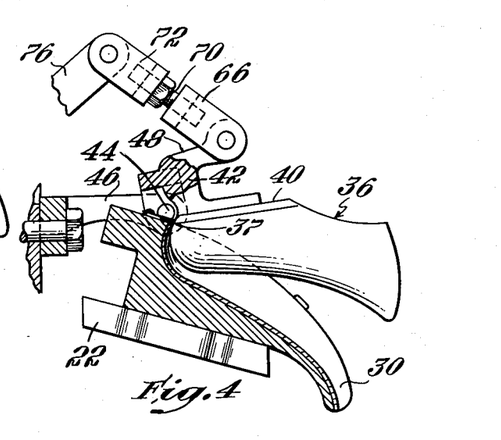
Fig. 4 is a view corresponding to Fig. 3 with a shoe part placed between the mold parts and gripped by initial engagement of the parts.
Figures 5, 6:
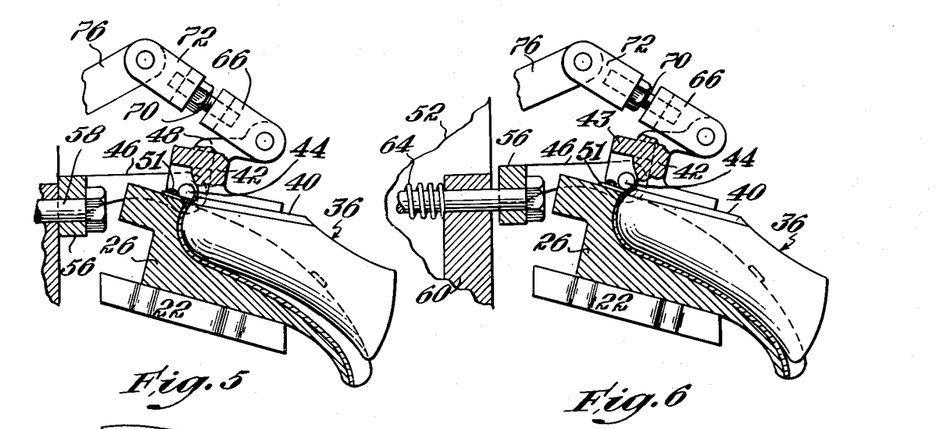
Fig. 5 is a view corresponding to Fig. 3 with the mold parts partially closed.
Fig. 6 shows the mold parts completely closed.
Figure 7:
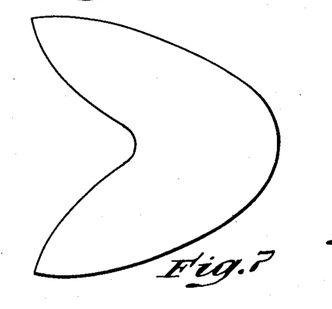
Fig. 7 shows a typical upper part prior to molding.

In the operation of the machine as described in Figs. 1 to 6 inclusive, a flat shoe part such as shown in Fig. 7, or the forepart of an assembled upper open at the bottom, is placed between the male and female mold members 24 and 36, as illustrated in Fig. 3, with the peripherally extending lasting margin, if there is a margin, projecting forwardly between the forward or tip end of the mold parts and with its lateral edges engaged with the guides 51, whereupon the operator steps on the treadle 88 to bring the male mold part downwardly about the pins 44—44. The initial movement of the male mold part brings the nose 37 of the male mold part at its forward tip end into clamping engagement with the lip 29 of the forward tip end of the female mold, thereby firmly gripping the upper material between them at or near the lip of the recess of the female mold as is illustrated in Fig. 4. The initial contact of the mold parts will be along a narrow, peripherally extending arc at the tip ends of the parts, and hence will grip and hold a narrow, peripherally extending area of the upper at the tip. The initial point of contact of the parts between the nose 37 and the lip 29 now becomes the center of rotation about which the parts move relatively to each other, and from which the complementary surfaces begin their first contact and progressively increase their contact until the parts are completely engaged, so as progressively to press and stretch the upper material into the cavity of the female mold without releasing hold on the edge of the upper material first seized. The spring 64 opposes any forward movement of the male member 36 with reference to the female member, hence as the male member rolls into complete engagement with the female member, considerable stress is applied due to the thickness of the upper material which tends to force them apart, and which is opposed by the stiff spring 64 and hence provides considerable pressure between the parts. The spring also draws the male part forwardly as it enters the female part so that its forward or tip end is pressed into the somewhat reentrant forward end of the female part below the lip 29. Just before the male part 36 has been brought into complete engagement with the female part and before the actual pressure is applied, the shoe part may be shifted laterally and longitudinally to register it properly with the molding parts, the latter being manually adjustable as indicated above. When a shoe part has been properly located final molding pressure is secured by tripping the switch 114 which energizes the solenoid and draws the parts into final gripping relation. This, as heretofore explained, holds the parts together until the timing clock effects a release.

Figure 8:
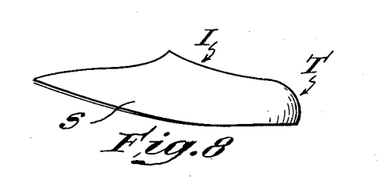
Fig. 8 is a side elevation of the upper part after molding.

The female part is heated by a coil referred to heretofore and the combination of heat and pressure imparts a permanent set to the material of the shoe part so that it has a shape which corresponds to the toe of the last as illustrated in Fig. 8. The timing clock is set so that for the pressure and temperature employed, the proper amount of set is procured for the particular kind of upper material being used. Upon the deenergization of the solenoid, a spring S' connected to the actuating rod 80 serves to draw the rod 80 downwardly and hence to separate the mold parts so that the molded part may be removed.

The cavity in the female mold, as will be seen by reference to Fig. 11, extends rearwardly from the tip so as to include the reverse curve of the instep at the top of the foot and hence molding is imparted not only to the tip, but also to the instep of the toe, thereby providing for the reverse curves in the upper (Fig. 8) which are difficult to obtain in conventional lasting operations because of the tendency of the material to drum across hollows or depressed surface portions of the last.

Figure 9:
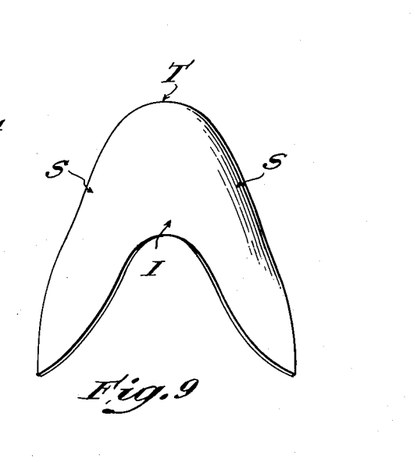
Fig. 9 is a plan view of the upper part after molding.

The shoe part illustrated in Figs. 7, 8 and 9, illustrating the operation of the apparatus and method of molding, is the forepart of an upper such as would be used in making the California type shoe, and as illustrated in Fig. 7, is flat. After molding, the toe tip T is spherically shaped, the instep I at the top is slightly concave and the sides S are convex. Following molding, an insole and wrapper strip would be attached to the free edge of the molded upper, whereupon it would be placed on a last and the wrapper would be lasted in over a platform placed on the insole and finally a bottom would be applied. While the forepart of the shoe here shown is not attached to the quarters, it is within the scope of the invention to treat a completely assembled upper consisting of the forepart and quarters joined in circular fashion and open at the top and bottom.

Prewelt shoes may also be molded with this apparatus, the forepart of the upper first being molded as described above, and then the welt strip being stitched flat against the outside along the lower edge of the molded part. Upon application of the sole, the welt will be folded outwardly and downwardly from the upper to a horizontal position for stitching thereto.

The apparatus is also useful and equally applicable to molding Goodyear, McKay and stitchdown shoes. In Goodyear and McKay shoes, the forepart of the upper would be introduced between the mold parts so that the lasting allowance or margin projected beyond the mating surfaces. After molding of the forepart, the upper would be mounted on a last in the customary fashion, and the unmolded flexible lasting margin would then be stretched and lasted in over the bottom. In like manner, the margin provided at the edge of the upper for stitchdown shoes would be pushed far enough forward of the molds so as not to be acted upon by the molding members.

Thus it is evident that premolding may be practiced on any of the conventional shoe uppers, that the molding takes in not only the tip of the toe, but extends rearwardly thereof throughout the convex top and sides of the toe, the reverse curve or concave portions immediately behind the top and a substantial portion of the instep, and that this premolding conforms the upper material to the last with a glove-like fit. The molding stretches the material over the convex portions and shrinks the material at the concave portions by a combination of pressure which effects stretching, and heat which effects the shrinking. The molding is of course, most effective and permanent with grain leather of good quality and weight, however good results have been obtained even with light leather and fabrics, especially if the leather and/or fabric is impregnated with a stiffening compound such as some of the resins. It is therefore, within the scope of the invention to include an upper material impregnated and/or coated with a stiffening composition, or to include with the upper material, lining material which may or may not be impregnated with a pressure sensitive and/or thermosetting composition, many kinds of which are available for shoe manufacture.

The premolding eliminates the care required in ordinary lasting operations to bring the upper into close conformation with the last so that operators need only concern themselves with lasting of the wrapper or lasting the margin, as the case may be. This in large part, eliminates the need for skilled operators, and yet permits production of shoes of high quality and appearance and which will endure prolonged wear without loss of shape.

The use of the apparatus in its modified form for molding rubber shoes is in all respects similar to that described above except for the fact that the female mold is yieldable having a flexible diaphragm which conforms to the shape of the male mold when the latter is pressed against its surface and is not heated, the male mold being heated instead. Progressive molding takes place in the same manner since the tip of the upper is first gripped between the tip of the male mold and the diaphragm of the female mold as the latter are brought together and thereafter the parts are progressively brought into mutual engagement.

While molding apparatus may be supplied with a single molding unit, it is usually desirable to provide an apparatus with two or more molding units, for example four molding units, so that in operation, a single operator may attain high production. This is possible by setting the timing device which holds the molding parts together so that when the operator loads the units successively the time required to complete loading will be approximately equal to the molding time and hence when the last unit has been put into operation to effect molding, the first unit will just be completing the molding operation and the mold parts will be automatically released and separated so that the molded part may be removed therefrom.

It should be understood that the present disclosure is for the purpose of illustration only and that this invention includes all modifications and equivalents which fall within the scope of the appended claims.

I claim:

1. Apparatus for molding shoe parts comprising a supporting frame, a molding unit mounted on the support, said unit having cooperable mold parts arranged to receive between them the shoe parts to be molded, said mold parts being relatively movable to bring them into engagement, means for effecting relative movement of the mold parts to engage the shoe part, independently operable means for holding the mold parts together under pressure after they have been drawn together, means for operating said last named means, timing means associated with the holding means for releasing the holding means at the end of a predetermined time and hence to release the mold parts, and means for effecting separation of the mold parts following release.

2. Apparatus for molding shoe parts comprising a supporting frame, a molding unit mounted on the support, said unit having cooperable mold parts arranged to receive between them the shoe part to be molded, said mold parts being relatively movable to bring them into engagement, means for effecting relative movement of the mold parts to engage the shoe part, independently operable means operable to hold the mold parts together under pressure after they have been engaged, means for effecting operation of the holding means, timing means associated with the holding means for releasing the holding means at the end of a predetermined time and hence to release the mold parts, means for initiating operation of the timing means upon operation of the holding means, and means for effecting separation of the mold parts following release thereof.

3. Apparatus for molding shoe parts comprising a supporting frame, a molding unit mounted on the support, said unit having cooperable mold parts arranged to receive between them the shoe part to be molded, said mold parts being relatively movable to bring them into engagement, mechanism for effecting relative movement of the mold parts to engage the shoe parts therebetween, electrical means operable to hold the mold parts together under pressure after they have been engaged, means for effecting operation of the electrical holding means, timing means associated with the holding means operable at the end of a predetermined time to render said electrical holding means ineffective, operation of said timing means being initiated by actuation of said holding means, and means for effecting separation of the mold parts following release of said holding means.

4. Apparatus according to claim 1, wherein one of the mold parts has a work engaging surface yieldably conformable to the other mold part.

5. Apparatus for molding shoe parts comprising male and female parts having mutually engageable surfaces, said female part being fixed and said male part being movable to and from the female part, means pivotally supporting the male part with a portion of its surface boundary close to a corresponding portion of the surface boundary of the female part, and with the remainder of said surfaces diverging, means for effecting angular movement of the male part about said pivot to bring the mutually engageable surfaces together progressively, starting with the initially most closely arranged portions of the surfaces, and spring means for applying pressure to the parts when fully engaged, said spring means being rendered effective by movement of the mold parts into engagement.

6. Apparatus for molding shoe parts comprising mold parts having mutually engageable surfaces, a portion of one part corresponding in shape to the forepart of a last having a toe, said parts being relatively movable and initially being held separated to permit an upper to be placed therebetween, means supporting the one part with the tip of its toe adjacent the other part with a clearance therebetween, said parts being movable initially to bring the tip of the one part and the other part together to seize the lasting margin at the tip of the toe and then progressively to bring successive portions of the one part and the other part rearwardly of the tip into mutual engagement, means for effecting such movement of the parts and means for yieldably applying pressure to the parts, said last-named means being brought into operation by complete engagement thereof.

7. Apparatus for molding shoe parts comprising cooperable mold parts, one of which is a last and the other a yieldable body, said parts being relatively movable and initially being held separated to permit an upper to be placed therebetween, means supporting the last with the tip of its toe adjacent the yieldable body but with a clearance therebetween, said parts being movable initially to bring the tip and yieldable body together to seize the lasting margin of the upper at its tip and then progressively to bring successive portions of the last and yieldable body rearwardly of the tip end of the toe into mutual engagement, means for effecting such movement of the parts and means for yieldably applying pressure to the parts, said means being brought into operation by complete engagement of the parts.

8. Apparatus according to claim 7 wherein the yieldable body is an elastic diaphragm.

9. Apparatus according to claim 7, wherein the yieldable body is an elastic diaphragm stretched across and forming the top of a rigid receptacle filled with an incompressible fluid to the exclusion of air.

10. Apparatus according to claim 7, wherein the yieldable body is constituted by a rigid box, the top and front of which are curved to correspond substantially to the curvature of the profile of the top of a last, an elastic diaphragm is stretched across the top and front of the box and forms a cover therefor, and the box is filled with an incompressible fluid to the exclusion of air.

11. Apparatus according to claim 7, wherein the yieldable body is constituted by a rigid box having an abbreviated front wall and side walls which slope toward the front wall following a curvature corresponding to the profile of the top of the last, an elastic diaphragm attached to the top and following the curvature of the side walls down to the top of the abbreviated front wall forming a longitudinally convex top for the box, and an incompressible fluid filling the box to the exclusion of air.

12. Apparatus according to claim 7, wherein the yieldable body is constituted by a rigid box having a front wall and side walls, the upper edges of which slope toward the front wall along a curvature corresponding to the profile of the top of the last, said front wall having a substantially U-shaped opening extending from its upper edge nearly to the bottom of the box, an elastic diaphragm stretched across the top of the box, said diaphragm following the curvature of the upper edges of the side walls down to the top of the front wall and across the U-shaped opening therein, and an incompressible fluid filling the box beneath the diaphragm to the exclusion of air.

13. Apparatus according to claim 7, wherein the yieldable body is an elastic diaphragm stretched across and forming a top of a rigid box, said diaphragm having a surface which is normally upwardly convex.

14. Apparatus according to claim 7, wherein the yieldable body is an elastic diaphragm stretched across and forming a top of a rigid box containing an incompressible fluid, said diaphragm having a surface which is longitudinally and transversely upwardly convex.

References Cited in the file of this patent

UNITED STATES PATENTS

| | | |
|---|---|---|
| 1,019,310 | Dunn | Mar. 5, 1912 |
| 1,513,572 | Voss | Oct. 28, 1924 |
| 1,680,670 | Donovan | Aug. 14, 1928 |
| 2,175,474 | Lawson | Oct. 10, 1939 |
| 2,271,682 | Dodge | Feb. 3, 1942 |
| 2,292,380 | Kersten | Aug. 11, 1942 |
| 2,293,282 | Dodge | Aug. 18, 1942 |
| 2,306,566 | Randall | Dec. 29, 1942 |
| 2,357,596 | MacDonald | Sept. 5, 1944 |
| 2,421,604 | Eaton | June 3, 1947 |
| 2,486,537 | Senflebin | Nov. 1, 1949 |
| 2,487,421 | Calder | Nov. 8, 1949 |